A. C. LEGG.
SMOKE CURING APPARATUS.
APPLICATION FILED JULY 13, 1917.

1,333,552.

Patented Mar. 9, 1920.
2 SHEETS—SHEET 1.

Witness

Inventor
Andrew C. Legg.

By

Attorney

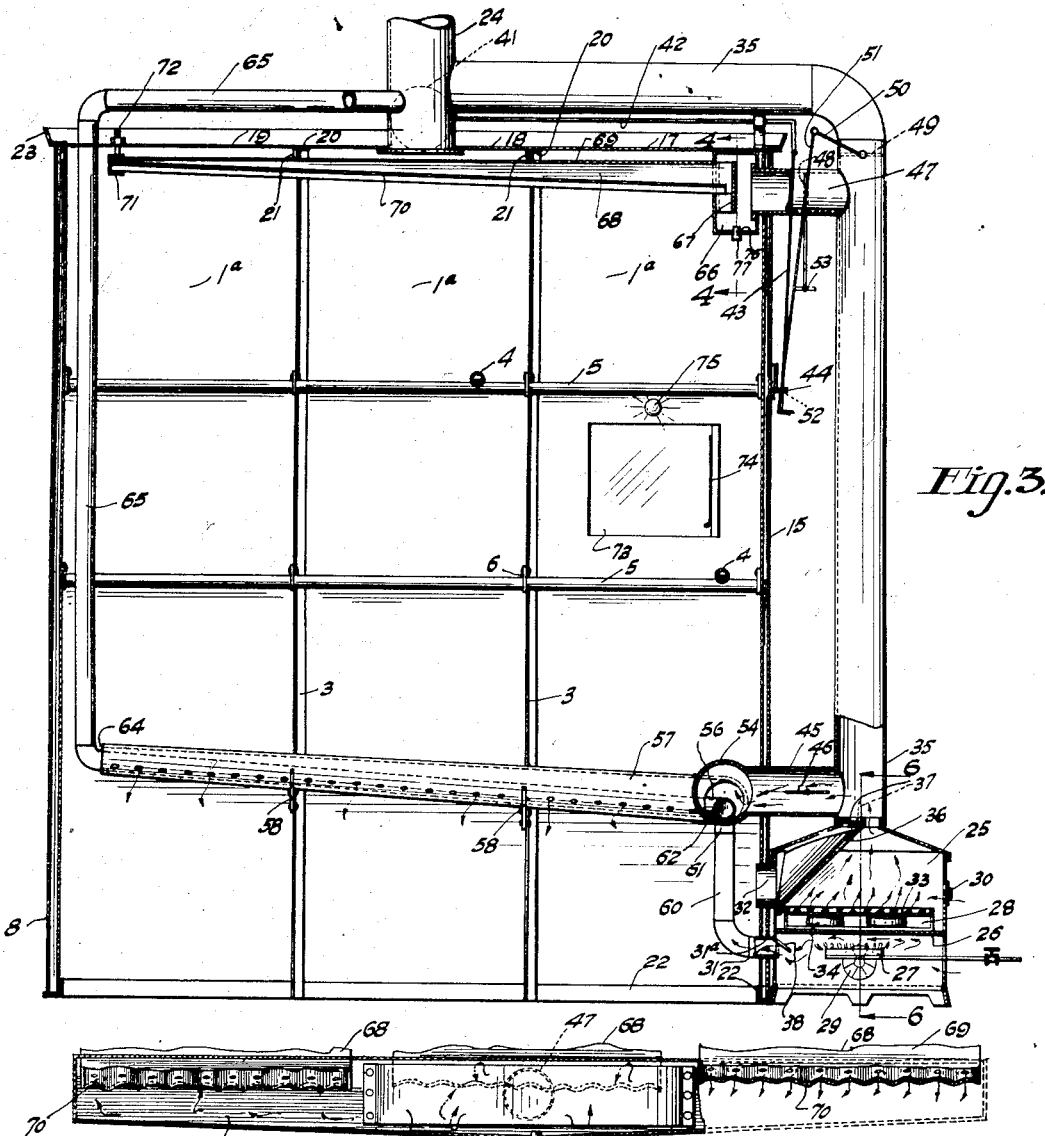
Fig.3.
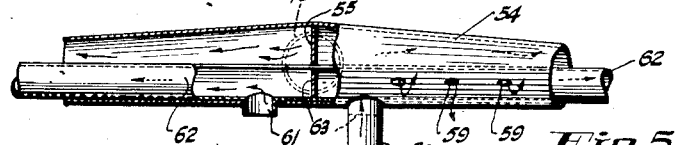
Fig.4.
Fig.5.
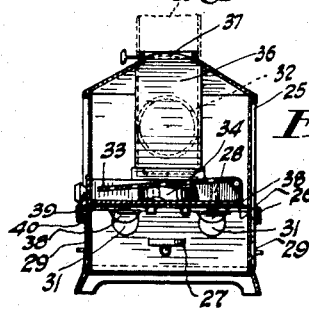
Fig.6.

UNITED STATES PATENT OFFICE.

ANDREW C. LEGG, OF BIRMINGHAM, ALABAMA, ASSIGNOR TO LEGG MEAT CURING COMPANY, A CORPORATION OF ALABAMA.

SMOKE-CURING APPARATUS.

1,333,552. Specification of Letters Patent. Patented Mar. 9, 1920.

Application filed July 13, 1917. Serial No. 180,244.

*To all whom it may concern:*

Be it known that I, ANDREW C. LEGG, a citizen of the United States of America, residing at Birmingham, in the county of Jefferson and State of Alabama, have invented certain new and useful Improvements in Smoke-Curing Apparatus, of which the following is a specification.

My invention relates to a novel type of smokehouse and drier and forms a continuation of the application filed by me on the 8th day of March, 1915, Serial No. 13,064.

The object of my invention is to provide an apparatus in which the temperature, circulation and condensation of the smoke or curative gases are maintained under such accurate control that the process of curing or drying the meat, fish, vegetables, or other articles can be conducted with scientific exactness to the ends that there shall be a minimum shrinkage or loss in weight of meat treated, that all articles shall be thoroughly cured, and that, when finished, the meat or other articles shall have a clean, properly colored and attractive appearance and in the case of meat shall also have a surface glaze which will effectively protect the same from moisture so that the wrapping can in most instances be dispensed with.

In a companion application Serial No. 94,513, I have described and claimed the duplex smoking process which it is my purpose to conduct in the apparatus forming the subject matter of this invention, such process as applied to the curing of meats, involving a preliminary drying process with a hot smoke or gas for the elimination of excess moisture from the meat and the subsequent treatment of the dried meat with cool smoke which is substituted for the hot smoke as soon as the fatty tissues of the meat commence to break down under the drying process, or, as it is termed in the trade, as soon as the meat begins to show fat shrinkage. In order to cause the maximum deposit of the curative agent in the smoke on the meat it is desirable to conduct this cool smoke process, or a part at least thereof, by a down circulation of the cool smoke through the smokehouse and to maintain the same as part of a continuous circulation of the smoke in circuit through the smokehouse and the smoke generator by a natural draft induced by the heat in the smoke generator which is just sufficient to maintain this circulation and to gradually supplement the circulating volume of smoke with new smoke so as to maintain its effectiveness in the smokehouse. The condensing action which causes the heavy deposit of the curative properties on the meat takes place as the smoke chills in settling through the smokehouse. My apparatus is especially designed to carry out the processes above described.

Where utilized to cure or dry vegetables or evaporate fruit, the drying functions of the apparatus only are used and in such cases the generation of a curative smoke is abandoned and a hot gas, such as air, is the medium passed through the generator and introduced into the curing chamber to carry off the moisture and to assist in heating the chamber.

This invention further comprises improvements in the smoke and heat distributing piping systems, an important feature being the utilization of the smoke generating heat as a means for controlling the temperature of the box by radiation, it being my purpose that the products of active combustion shall be excluded at all times from gaining access to the articles in the curing chamber so that they will be kept free from soot or dirt and have a clean attractive appearance.

A further object of my invention is to so design the apparatus that its capacity can be increased at will with a minimum expense, this being obtained by constructing the body in sections or units which can be knocked down for shipment.

A further feature of my invention relates to the provision of means by which the curing process may be observed without requiring the box to be entered, this being of advantage in avoiding the escape of heat or smoke into the room in which the apparatus is located and in enabling the operator to rapidly and accurately determine the condition of the articles under treatment in the several apparatuses entrusted to his care. My object in this and other structural features being to provide the maximum simplicity in the treatment of the meat or drying of articles so that the process can be conducted without requiring skilled labor and with a maximum production per unit of labor.

My invention having been primarily designed as a smokehouse, will be so referred to, but with the understanding that such term is generic to a curing apparatus for drying or evaporating fruits and vegetables as well as curing meats.

My invention further comprises the various novel details of construction and arrangements of parts which are hereinafter more fully described and pointed out in the appended claims, and which are illustrated in their preferred embodiment only in the accompanying drawings which form a part of this specification, and in which:—

Fig. 3 is a vertical section taken through the smokehouse and generator on the line 3—3, of Fig. 2.

Fig. 4 is a sectional view through the distributing box and one of the smoke distributers taken along the line 4—4, of Fig. 3, and through the distributer at a line nearer the center of the box.

Fig. 5 is a detail sectional view taken on the line 5—5, of Fig. 2.

Fig. 6 is a vertical section taken on the line 6—6 through the smoke generator in Fig. 3.

Similar reference numerals refer to similar parts throughout the drawings.

Figure 1:
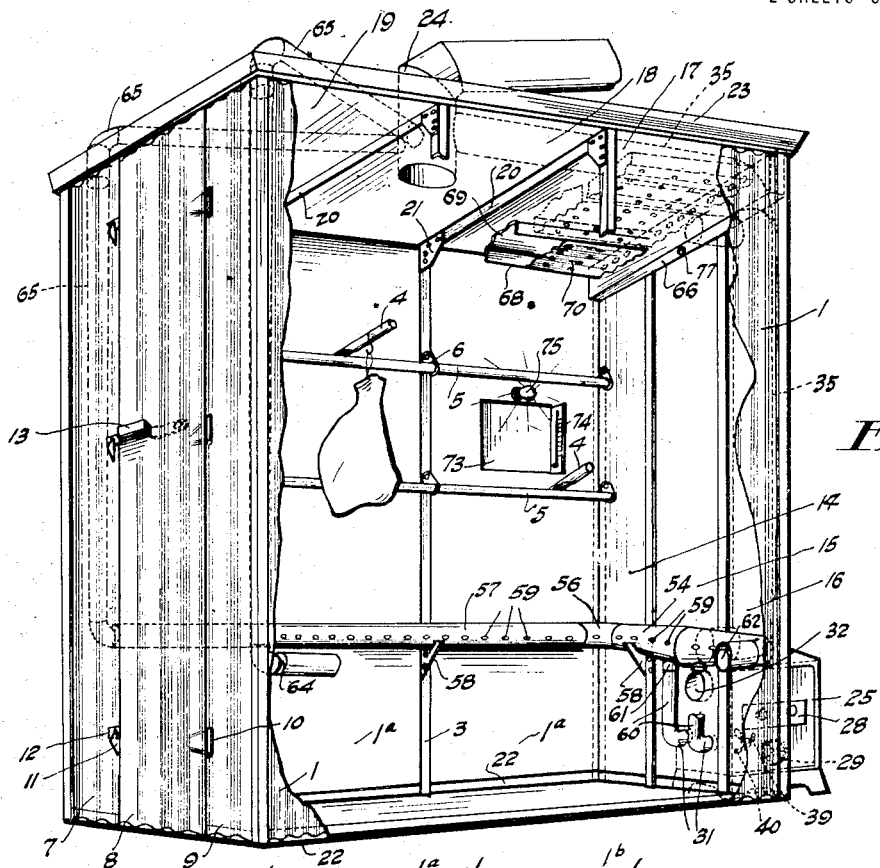
Figure 1 is a perspective view with a side of the smokehouse broken away and with the top smoke distributers also broken away for the sake of clearness.
Figure 2:
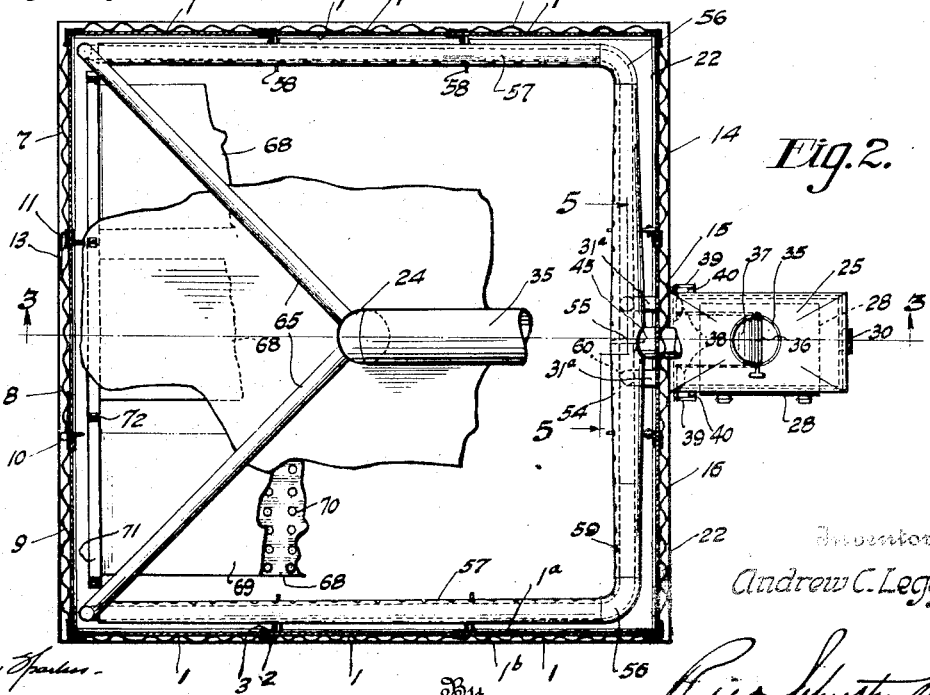
Fig. 2 is a top plan view of the smokehouse showing the piping system complete and having the top cover broken away.

As illustrated, the smokehouse, as a separate unit, is made up of vertical side and end sections and transverse top sections which are preferably made of galvanized sheet metal and are standardized so that by the insertion of additional top and side sections I can increase the capacity of the smokehouse.

The vertical side sections 1 are formed preferably of two metal plates suitably connected by spot welding or riveting, the inner being a flat sheet 1ª and the outer a corrugated sheet 1ᵇ, thus producing side walls of considerable strength and with air spaces which if desired may be filled with any insulating material, such as mineral wool, so as to reduce to a minimum the radiation of heat from the smokehouse. At their meeting side edges the sections are lapped and bolted together between outer vertical bars 2 and inner vertical angles 3, these serving also to stiffen the walls and to take the direct load of the material under treatment in the box. Where trees are not used, the meat is hung from cross bars or pipes 4 which have their flattened ends resting upon bars or pipes 5 extending lengthwise of the box and supported by hangers 6 that are bolted to the angle irons 3.

The front of the box is formed by upright sections 7, 8 and 9 formed similarly to the sections 1 except that the section 8 forms a door. The section 9 carries the hinges 10 and the section 7 carries the keepers 11 for the door latch, these keepers being disposed to co-act with top, intermediate and bottom latches 12 pivoted to the door section and all connected by a slide bar for joint control by one handle 13 in the manner well understood in the art.

The rear end of the smokehouse is formed of vertical sections 14, 15 and 16, similar to the side sections 1 except that the intermediate section 15 is provided with a plurality of apertures for the heat and smoke pipes which will later be described.

The top of the box comprises transverse sections 17, 18 and 19 formed of single sheets, which are braced and supported along their lapped meeting edges by angle irons 20 which are braced by the plates 21 to the side angles 3. The air spaces between the flat and corrugated sheets are closed top and bottom in any suitable manner. I prefer to use a bottom angle 22 for each side and end of the smokehouse, its vertical flange being bolted to the inner face of sheet 1ª and both sheets 1ª and 1ᵇ being seated on its horizontal flange, as seen in Fig. 3. The flat top plates lap over and close the top openings between the sheets 1ª and 1ᵇ and also carry an ornamental cornice 23. The middle top section 18 is provided with an opening at its center for the main smoke outlet pipe 24.

The general structure of the smokehouse having been thus described, the smoke generating and distributing apparatus will now be described.

The smoke is generated by a stove 25 having a thin transverse solid diaphragm or partition 26 below which is arranged a burner 27 for gaseous fuel and upon which is adapted to be seated a fuel drawer 28 which is preferably insertible from the side of the box through a suitable opening therefor. The sides of the stove carry side dampers 29 below the partition and an end air inlet damper 30 above the drawer. In the rear end of the stove below the partition are two heat outlet ports 31 surrounded by nipples 31ª and above the partition is a large smoke return port 32 also surrounded by a nipple. The smoke drawer 28 carries a hinged perforated smothering plate 33 to prevent active combustion from blocks of wood 34 placed thereunder and from which the smoke and fuel gases are driven off by heat from the burner 27, these gases passing off from the stove through a smoke pipe 35. A division plate 36 is set into the top of the stove so as to form a flue connecting the port 32 with the pipe 35, the upper part of this plate preferably bisecting the stove opening for the pipe 35 and carrying a damper 37 adapted to shut off the return circulation of smoke through the port 32 to the pipe 35. In like manner the heat ports 31 are controlled by dampers 38 which can be set by means of a handle 39 and a rack plate 40 in any desired position.

No claim is made herein for the construction of the stove as the same forms the subject matter of my pending application Serial No. 193,967, filed September 29th, 1917.

The smoke pipe 35 extends above and then over the smokehouse to join the smoke outlet pipe 24 above a damper 41 therein which is controlled by a damper rod 42 that extends to the rear edge of the box, being there bent to form a crank which is connected to the operating rod 43 which passes through a spring catch 44 on the smokehouse. The vertical leg of the smoke pipe 35 has connected thereto a lower branch pipe 45 having a damper 46 therein and an upper branch pipe 47 having a damper 48 therein, and above the branch 47 the pipe 35 carries a damper 49 which is operated by a crank 50 and rod 51, which latter passes through a spring catch 52 adjacent to the catch 44. A handle 53 for the damper 48 also extends to a point adjacent to the catches 44 and 52 and the handles for the dampers 37, 38 and 46 are all disposed so that all dampers can be manipulated from, and all functions of the apparatus regulated at, one point of control.

The hot smoke distributing apparatus comprises a rear reversely tapering pipe 54 having a partition 55 at its enlarged center opposite the point where the hot smoke pipe 45 opens thereinto after passing through the rear wall of the smokehouse. The partition thus serves to divide the hot smoke, causing half to flow in opposite directions across the rear end of the smokehouse where the ends of the pipes are reduced to a standard size and connected by elbows 56 to the side pipes 57 which extend to the front end of the box below the level of the meat under treatment. The pipes 54 and 57 are supported by suitable brackets 58 attached to the angle irons 3 and along the lower inner edge of the pipes are provided a series of smoke outlet holes 59 through which the smoke is caused to flow substantially horizontally toward the center of the box.

The heat distributing piping system comprises nipples 31ª which surround the heat ports 31 and are of sufficient length to project through the rear wall of the smokehouse when the stove abuts against it. Upright pipes 60, each having a right angled bend at its lower end where it joins to its respective nipple 31ª, extend upwardly to the pipe 54 where they are joined to nipples 61 carried by the rear horizontal heating pipe 62 and adapted to project through bottom openings in the pipe 54 on each side of its partition 55. The hot smoke pipe 54 is enough larger than the heat pipe 62 to permit the latter to be inserted through its ends and then lowered to cause the nipples 61 to project below the same and make a joint with the pipes 60. The partition 55 is provided with a suitable hole for the passage of the pipe 62 and this pipe itself is divided by a partition 63 which is inserted and made fast thereon between the nipples so as to divide the heat pipes into two separate flues through which the hot gases flow in opposite directions to the sides of the smokehouse where, by suitable connections these heat pipes are given a right angled bend in the elbows 56 and continue within the pipes 57 the full length of the sides passing through the heads 64 which close the outer ends of the pipes 57 (Fig. 1). The heat pipes then extend vertically in each front corner of the smokehouse to and through the top thereof and are there connected by pipes 65 to the pipe 24 above the damper in the latter. My object in passing the heating pipes through the hot smoke pipes is to maintain the hot smoke at a substantially uniform temperature throughout the pipes 54 and 57 and, moreover, the exposed heat pipes at the front of the box will have sufficient radiating heating effect to offset the presence of the stove at the rear of the smokehouse and to heat the interior of the latter with substantial uniformity.

The cold smoke distribution system connects with the pipe 47 after it has passed through the rear wall of the smokehouse. This pipe 47 first delivers the smoke into a transverse distributing box 66, preferably arranged inside of the smokehouse and extending from side to side at the top of the rear wall thereof. In order to distribute the smoke uniformly throughout this box, a baffle 67, formed by a bent metal plate of less width than the depth of the box, is attached thereto in front of the pipe 47, thereby causing a uniform supply of smoke to enter the top distributers 68. Three of these distributers are shown arranged lengthwise of the smokehouse, each having its sides and tops formed by a bent metal sheet 69, the sides being of graduated depth which increases toward the smoke supply end. The bottom of the distributer is formed by a corrugated plate 70 having perforations along the tops of the inwardly projecting ridges which run lengthwise thereof. A suitable opening is cut in the inner wall of the distributing box 66 so that the larger end of each distributer 68 can be inserted therein with a fairly close fit, it being noted (Fig. 3) that the bottom sheet projects well into the box 66 so that the liquid condensation that collects between the perforated ridges will run down and fall into the box which has its bottom sloped toward a drain hole 76 normally closed by a plug 77. The forward ends of the distributers are received in clips 71 and made fast by bolts 72 to the top of the smokehouse. These distributers hang under the top reinforcing angles 20 and may be braced thereto if desired. Substantial spacing is left between the distributers as it is my purpose to have the outlet pipe 24 open through the top above the central distributer 68 so that the latter serves as a baffle which will distribute the suction of updraft from the pipe 24 more uniformly throughout the smokehouse than if the smoke was drawn directly into the pipe 24.

In order that the articles under treatment can be accurately observed without opening the smokehouse, I provide a sight window 73 in any suitable part of the walls, the window being formed by spaced glass plates. A thermometer 74 is arranged in the box beside the window so that it can be observed therethrough, and an electric light 75 is provided in the box in position to illuminate the meat near the window and the thermometer.

In operation, the smoke is generated in the stove and passes through pipe 35 directly to the stack pipe 24, the damper 49 being opened until it is desired to start the curing process when the dampers 37, 48 and 49 are closed and the dampers 38, 46 and 41 are opened. This causes the heat generated by the burner to flow through the heat pipes 60 and 62 and the smoke to flow through pipes 45, 54 and 57 into the lower part of the smokehouse through which the smoke rises and passes over the central distributer 68 and out through the pipe 24. Under these conditions the burner 27 is at full heat and the damper 30 is opened so that a considerable volume of hot air and smoke is passed through the meat to dry it rapidly. As the meat dries out the heat is reduced and the burner lowered until a cool smoke is passing through the meat. When it is desired to make use of the continuous circulation of cool smoke for the purpose of finishing the cure and causing a heavy deposit of curative agents on the meat, the following readjustment of dampers is made, to-wit: Dampers 41 and 46 are closed and dampers 48 and 37 are opened, whereupon a relatively cool smoke rises by a natural draft in pipe 35 and, damper 49 remaining closed, passes through pipe 47 into the distributing box 66 and thence into the distributers 68 from which it flows downwardly through the bottom holes in the latter and settles through the meats as it chills. The chilled smoke is drawn off from the bottom of the smokehouse by a return draft through the port 32 and passes above the division plate 36 into the pipe 35, thus completing its cycle and forming a continuous circulation which is gradually supplemented by fresh smoke and reheated to a small extent in its passage through the stove. The chilling of this smoke as it descends slowly through the meats causes a very heavy deposit of curative agents on the meat during the final stages of the cure. At the conclusion of the curing process hot smoke is again turned on through pipes 54 and 57 to dry out the meat thoroughly and form a protecting surface glaze by drying the coating of curative agents thereon. The response of the meat to the treatment can be observed through the window 73 and the smoke and heat controlled accurately and in the simplest possible manner, to complete the cure rapidly and with a minimum loss by shrinkage, the whole operation being fundamentally different from the haphazard smoking operation now in general use.

In drying vegetables and evaporating fruit, the fuel drawer 28 is emptied of all fuel and is preferably removed, so that air may pass through the upper chamber above the partition 26 and enter the curing chamber through the distributer pipes 57. The radiation pipes 62, 65 are heated to the desired extent to produce the requisite temperature in the chamber and the top damper 41 is opened to permit the moisture laden air to pass off through the stack 24. The discharge of the hot gases from the heating pipes 65 into the stack 24 will serve to considerably increase the draft therein and thereby increase the circulation of hot air through the articles being dried.

When I refer in the claims to a smoke generating chamber in the stove or furnace, it will be understood that I refer to the chamber which is heated by the fire in the combustion chamber, whether such smoke generating chamber be used to generate smoke or any other gas, or merely to heat air while passing therethrough.

Having thus described my invention, what I claim as new and desire to secure by Letters Patent, is:—

1. In a curing apparatus, a curing chamber, a heating furnace having a smoke generating chamber inaccessible to the drippings of the articles to be cured and having an air inlet, a burner for heating the generating chamber, and means to deliver the hot gases generated in the generating chamber into the presence of the articles under treatment in the curing chamber, and means to exclude the products of combustion of said burner from said articles under treatment.

2. In curing apparatus, a curing chamber for the articles to be treated, a fuel chamber adapted for the generation of smoke and which has communication with the curing chamber and is disposed so as to be inaccessible to the drippings of the meat, an air inlet valve for said fuel chamber, and an external heating furnace for the fuel chamber, the products of combustion from which are excluded from access to the articles under treatment in the curing chamber.

3. In a curing apparatus, a curing chamber, a smoke generating chamber in communication with the curing chamber and adapted to receive fuel for generating smoke, an external source of heat for heating said chamber, and a radiation piping system to pass the heated products of combustion from said source of heat through the curing chamber to heat it.

4. In a curing apparatus, a curing chamber, a fuel chamber adapted for the generation of smoke and which has communication with the curing chamber, fuel burning means external to said fuel chamber and curing chamber and adapted to heat them both, and regulable means to control the heating of the curing chamber independently of the heating of the fuel chamber, substantially as described.

5. In a curing apparatus, a curing chamber, a smoke generator external to and having communication with said chamber and comprising a gaseous fuel burner, and a smoke generating chamber, means to exclude the products of combustion from said burner from said generating chamber which is adapted to be heated by the burner, a radiator in said curing chamber, and a valve controlled means to pass the products of combustion from said burner through said radiator in the curing chamber to heat it, substantially as described.

6. In a curing apparatus, a curing chamber, a smoke generating furnace, and separate piping systems connected to said furnace, one adapted to deliver a gas free of the products of active combustion from said furnace into the curing chamber, and the other adapted to carry off the products of active combustion from said furnace, said latter system being arranged to heat the curing chamber by radiation.

7. In a curing apparatus, a curing chamber, a smoke generator comprising non-communicating combustion and smoke generating chambers, a distributing piping system which discharges into the curing chamber and is connected to said smoke generating chamber, and a heat radiation piping system which passes through the curing chamber and leads from said combustion chamber to a point of discharge for the products of active combustion.

8. In a curing apparatus, a curing chamber, a smoke generator comprising non-communicating combustion and smoke generating chambers, a distributing piping system in the curing chamber connected to said smoke generating chamber, a heat radiation piping system in the curing chamber connected to said combustion chamber, and separate dampers to control the distribution of heat and smoke from said generator to the curing chamber.

9. In a curing apparatus, a curing chamber, a smoke generator having non-communicating combustion and smoke generating chambers, a distributing pipe leading from the smoke generating chamber into the curing chamber, and a heating pipe juxtaposed to said distributing pipe and leading from said combustion chamber through the curing chamber.

10. In a curing apparatus, a curing chamber, a smoke generator having non-communicating combustion and smoke generating chambers, a distributing pipe leading from the smoke generating chamber into the curing chamber, and a heating pipe leading from said combustion chamber through the smoke distributing pipe and through the curing chamber.

11. In combination, a curing chamber, a smoke generating furnace, and piping means connecting the top and bottom of the curing chamber and exposed to the furnace heat at a point where heat will effect a downward circulation of smoke through the curing chamber.

12. In an apparatus for curing meat by smoke, a curing chamber, a smoke generator, means to deliver smoke from the generator by its natural draft into the curing chamber both below and above the meats, and pipe means in which a draft is induced by the generator to draw off the smoke from below the meats in the curing chamber.

13. In a meat curing apparatus, a curing chamber, a fuel chamber, means connecting the upper and lower parts of the curing chamber in circuit through said fuel chamber, and a heater acting on the fuel chamber and adapted to both generate smoke and maintain a circulation thereof through said circuit.

14. In combination, a meat curing chamber having an external pipe circuit connecting its upper and lower parts, a fuel chamber in said pipe circuit, means for admitting air and fuel into said fuel chamber, an external source of heat for heating said fuel chamber to generate smoke and induce a circulation thereof continuously through both chambers.

15. In combination, a curing chamber and a conduit partly without said chamber and which leads laterally into the top and bottom of said chamber, a fuel chamber included in and disposed near the bottom of said conduit, an air and fuel door for said fuel chamber, said conduit being closed except for said air and fuel door, and external means to heat said fuel chamber, said conduit being disposed to deliver the hot gases internally into the upper part of the curing chamber.

16. In combination, a curing chamber, a preservative generator, an upright smoke supply pipe leading from the generator and adapted to deliver smoke directly into the upper part of said chamber, means to distribute the smoke from said pipe over the upper part of said chamber, a source of combustion for generating smoke in said generator and which has no access to said pipe, and means to withdraw the smoke from the lower part of said curing chamber.

17. In a drying apparatus, a chamber to receive the articles to be treated, a marginal perforated distributing conduit for air or gas about the lower portion of said chamber, and a heater extending along said conduit to raise the pressure of the air or gas in said conduit.

18. In a smoke curing apparatus for meat, a curing chamber, a smoke generator, valve controlled means adapted to deliver the generated smoke into either the upper or lower portion of the curing chamber, and top and bottom damper controlled smoke outlet ports for the curing chamber.

19. In a smoke curing apparatus for meats, a curing chamber having top smoke distributing pipes and a bottom smoke outlet, and having also bottom smoke distributing pipes and a top smoke outlet, dampers for said outlets, a smoke generator connected to said top and bottom smoke distributers, and damper means to control the delivery of smoke to either set of pipes.

20. In a smoke curing apparatus for meat, a curing chamber, a marginal lower smoke distributing pipe, flat overhead smoke distributers, a smoke generator, valve controlled pipes to deliver smoke therefrom to either distributing means, and top and bottom damper controlled smoke outlets for said chamber.

21. In a meat curing apparatus, a curing chamber, a top smoke distributer having raised perforated portions in its inclined bottom, and a box to catch the condensation that flows down said bottom of the distributer.

22. In a meat curing apparatus, a curing chamber, a smoke generator, a series of top distributers with perforations, and a baffled distributer which receives the smoke from said generator and delivers substantially equal amounts thereof to said perforated distributers.

23. In a curing apparatus, a curing chamber, a marginal perforated distributing pipe in said chamber for hot gases, and a radiator pipe underlying said distributing pipe, as and for the purposes described.

24. In a curing apparatus, a curing chamber, a marginal distributing pipe in said chamber for hot gases, a heating pipe juxtaposed to said distributing pipe, and means to supply hot gases to said pipes.

25. In a curing apparatus, a curing chamber, a top outlet pipe leading from said chamber, means to introduce hot gases into said chamber, a heating pipe passing through said chamber and entering said pipe above the chamber and means without the curing chamber for delivering hot gases into said heating pipe.

26. In a curing apparatus, a curing chamber, a top outlet pipe leading from said chamber, means to introduce hot gases into said chamber, a heating pipe passing through said chamber and entering said pipe above the chamber, and a damper in said outlet pipe below the entrance of said heating pipe.

27. In a curing apparatus, a curing chamber, a draft stack leading from the center of the chamber top, a distribution piping system for admitting hot gases into the lower part of the chamber, and means to supply hot gases to said piping system comprising a furnace having smoke flues for carrying off its products of active combustion leading through said chamber in juxtaposition to said distribution piping system and entering said draft stack.

28. In a curing apparatus, a curing chamber, a draft stack leading from the center of the chamber top, a distribution piping system in the lower part of the chamber, and means to supply hot gases to said piping system comprising a furnace having flues for carrying off its products of active combustion leading through said chamber and passing along under said piping system and finally entering said draft stack, said flues being of equal length and symmetrically arranged in said chamber.

29. In a curing apparatus, a chamber having a damper controlled outlet, a closed circuit piping system leading through said chamber, a perforated piping system in said chamber, and a furnace having its combustion chamber connected to said closed circuit piping system, and having a heated chamber connected to said perforated piping system, and a drawer for smoke generating fuel removable from said heated chamber.

In testimony whereof I affix my signature.

ANDREW C. LEGG.

Witness:
NOMIE WELSH.